US010277620B2

(12) United States Patent
Beale et al.

(10) Patent No.: US 10,277,620 B2
(45) Date of Patent: Apr. 30, 2019

(54) DETERMINING AN ASSESSMENT OF A SECURITY BREACH FOR AN ASSET OF A NETWORK INFRASTRUCTURE

(71) Applicant: Corax Cyber Security, Inc., San Francisco, CA (US)

(72) Inventors: Thomas Beale, San Francisco, CA (US); Lewis Guignard, Charlotte, NC (US); Jonathan Pope, London (GB)

(73) Assignee: Corax Cyber Security, Inc., San Franscisco, CA (US)

( * ) Notice: Subject to any disclaimer, the term of this patent is extended or adjusted under 35 U.S.C. 154(b) by 204 days.

(21) Appl. No.: 15/259,477

(22) Filed: Sep. 8, 2016

(65) Prior Publication Data

US 2018/0069889 A1    Mar. 8, 2018

(51) Int. Cl.
    *H04L 29/06*    (2006.01)
(52) U.S. Cl.
    CPC ................ *H04L 63/1433* (2013.01)
(58) Field of Classification Search
    CPC ............. H04L 63/14; H04L 63/1433
    See application file for complete search history.

(56) References Cited

U.S. PATENT DOCUMENTS

| 8,170,977 | B2* | 5/2012 | Cox ................... G06N 7/005 |
| | | | 706/45 |
| 8,272,061 | B1* | 9/2012 | Lotem ................. G06F 21/577 |
| | | | 709/223 |
| 9,270,695 | B2* | 2/2016 | Roytnnan ........... H04L 63/1433 |
| 9,292,695 | B1* | 3/2016 | Bassett ................ G06F 21/577 |
| 9,537,884 | B1* | 1/2017 | Raugas ............... H04L 63/1433 |
| 9,979,743 | B2* | 5/2018 | Hovor ................. H04L 63/1433 |
| 2016/0248794 | A1* | 8/2016 | Cam .................. H04L 63/1433 |
| 2017/0078322 | A1* | 3/2017 | Seiver ................. H04L 43/0876 |
| 2017/0353480 | A1* | 12/2017 | Gao ..................... G06F 21/577 |

* cited by examiner

*Primary Examiner* — Khang Do
(74) *Attorney, Agent, or Firm* — Lowenstein Sandler LLP (57) ABSTRACT

An identification of an asset that is associated with a network infrastructure may be received. Additional assets of the network infrastructure that are associated with the asset may be identified and one or more values associated with a security breach for the additional assets of the network infrastructure that are associated with the asset may be received. Furthermore, an assessment of a security breach of the asset based on the received one or more values associated with the security breach for the additional assets of the network infrastructure may be generated.

17 Claims, 7 Drawing Sheets

DETERMINING AN ASSESSMENT OF A SECURITY BREACH FOR AN ASSET OF A NETWORK INFRASTRUCTURE

TECHNICAL FIELD

The present disclosure is generally related to network infrastructure, and more particularly, to determining an assessment of a security breach for an asset of a network infrastructure.

BACKGROUND

A computing asset (e.g., a desktop computer or laptop computer) may be attacked by an unauthorized entity. For example, the unauthorized entity may access protected or confidential data of the computing asset by exploiting weaknesses or vulnerabilities of the computing asset. Such vulnerabilities may correspond to an exploit that takes advantage of a known weakness of the software that is run by the computing asset to cause an unintended behavior for the software or the computing asset. The unintended behavior may allow the unauthorized entity to gain control of the computing asset and to access the protected or confidential data of the computing asset, or to use the computing asset for purposes other than its owner's original intentions.

BRIEF DESCRIPTION OF THE DRAWINGS

The present disclosure is illustrated by way of example, and not by way of limitation, and can be more fully understood with reference to the following detailed description when considered in connection with the figures as described below.

DETAILED DESCRIPTION

Aspects of the present disclosure relate to determining an assessment of a probability of a security breach for an asset of a network infrastructure based on relationships with other assets. A network infrastructure may include multiple computing assets such as servers, computing devices, mobile devices (e.g., smartphones), etc. and networks that couple the computing assets with one or more other computing assets of the network infrastructure.

A security breach for one of the assets may originate from another asset of the network infrastructure. For example, a first server of the network infrastructure may store secure data such as personal information or financial information of users or customers. An unauthorized entity may seek to obtain the secure data via a security breach of one or more assets of the network infrastructure. For example, a first computing device of the network infrastructure may be breached (i.e., compromised) or attacked by the unauthorized entity. Subsequently, a network that couples the first computing device to a second server of the network infrastructure may be used to attack the second server to obtain control of the second server or obtain other such information (e.g., log-in information) stored at the second server. Next, the unauthorized entity may access another network from the second server to attack the first server and gain access to the secure data stored at the first server. Thus, the first server may be subjected to a security breach from the unauthorized entity that accesses other assets of the network infrastructure in order to obtain access to the first server and retrieve the secure data.

The vulnerabilities of the first server may be assessed to determine a probability of a security breach of the first server. For example, an administrator of the network infrastructure may determine a probability of the first server being attacked and breached by an unauthorized entity based on known vulnerabilities of the first server. The administrator may subsequently mitigate the vulnerabilities to reduce the likelihood of a successful security breach of the first server by the unauthorized entity. For example, the administrator may provide or install a software update to the software run by the first server to mitigate known vulnerabilities or weaknesses of the software. However, the probability or likelihood of the first server being attacked by the unauthorized entity and successfully breached may be based on other assets or components of the network infrastructure that includes the first server as the attack of the first server may originate at another asset of the network infrastructure as described above. Thus, using characteristics of the first server to determine a probability or likelihood of the first server being successfully breached by the unauthorized entity may not be accurate.

Aspects of the present disclosure address the above and other deficiencies by determining a probability or likelihood of a security breach for an asset of a network infrastructure based on relationships with other assets. The network infrastructure may be represented by a network graph (e.g., a Bayesian network) with multiple nodes where each node corresponds to an asset or a resource of the network infrastructure. Such assets or resources may include, but are not limited to, a network, a component of an information technology (IT) infrastructure such as servers, computers, and cellular phones, a storage server that is storing data, or any other type of component used in a network infrastructure. Thus, the network graph may represent every asset of the network infrastructure where each node of the network graph represents one of the assets of the network infrastructure. In some embodiments, the network graph may further include nodes that represent entities associated with a use of the network infrastructure.

The nodes of the network graph may be connected by edges that represent a relationship between pairs of nodes. For example, an edge between a first node (e.g., a server) and a second node (e.g., a computer that accesses the server)

may represent a relationship between the first node and the second node (e.g., the computer is capable of accessing the server). Thus, edges may connect each node that represents an asset with another node that represents another asset that accesses or can access the asset.

A probability or likelihood of a security breach for one of the assets of the network infrastructure may be determined by using the network graph that represents each asset of the network infrastructure. For example, a particular node representing a particular asset may be identified and a probability or likelihood for the particular node being subjected to a security breach may be determined based on the probability or likelihood of the other assets that are related to the particular node of the network infrastructure are breached.

Thus, aspects of the present disclosure may provide enhanced security for assets of a network infrastructure by determining a probability or likelihood that a particular asset of the network infrastructure may be successfully breached by an unauthorized entity by analyzing the particular asset in context of other assets within network infrastructure. Such a probability or likelihood that is determined based on the context of the asset with other assets within the network infrastructure may provide a more accurate probability or likelihood of a successful security breach as opposed to analyzing the asset alone and without context with other assets of the network infrastructure.

Figure 1:
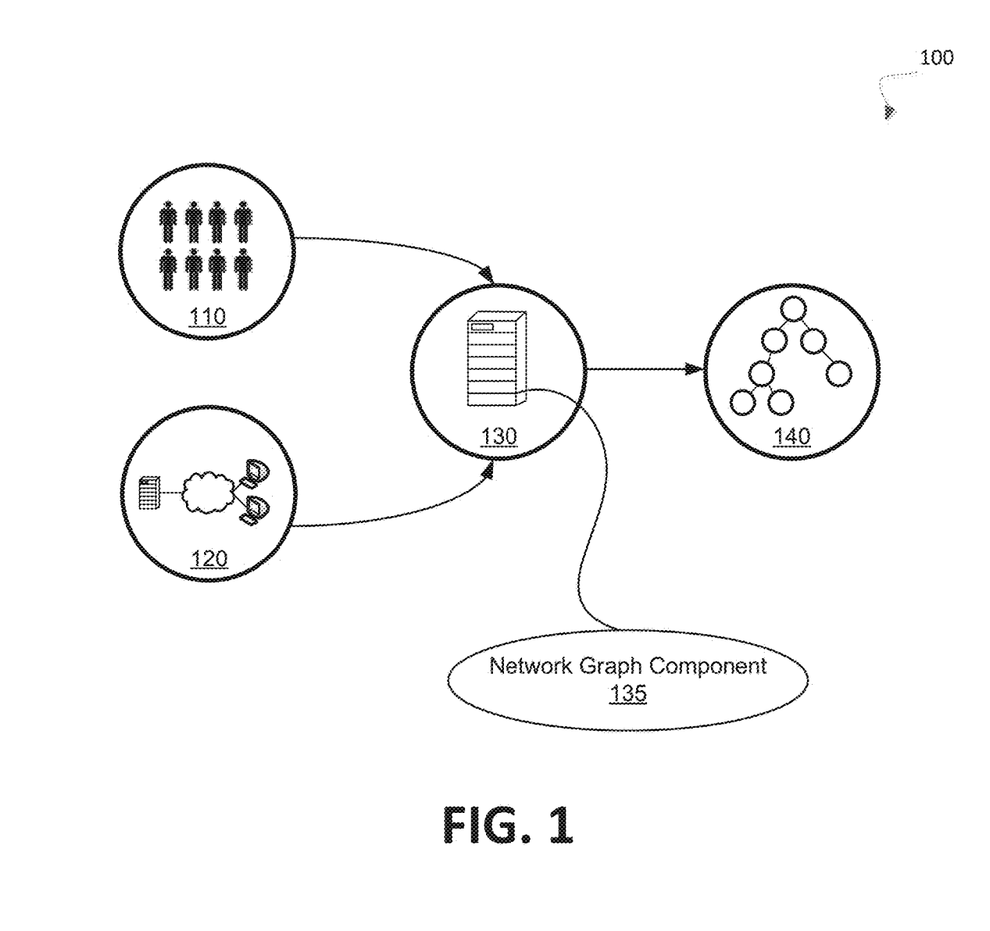
FIG. 1 illustrates an example environment to determine an assessment of a security breach for an asset of a network infrastructure in accordance with some embodiments of the present disclosure.

FIG. 1 illustrates an example environment 100 to determine an assessment of a security breach for an asset of a network infrastructure based on relationships with other assets. In general, the environment 100 may include a network graph component 135 that receives data associated with a network infrastructure and generates a network graph used to determine a probability of a security breach for an asset of the network infrastructure.

As shown in FIG. 1, the environment 100 may include the network graph component 135 of a server 130 that receives various types of data associated with a network infrastructure. For example, the network graph component 135 may receive entity data 110 and assets data 120. The entity data 110 may identify one or more entities that are associated with a use of the network infrastructure. For example, the entity data 110 may identify, but is not limited to, one or more corporations, organizations under the corporations (e.g., a sales department, information technology (IT) department, etc.), third party entities (e.g., other organizations providing external servers or external resources to the network infrastructure), and personnel (e.g., records identifying employees of the company). The entity data 110 may identify additional information for each of the entities. For example, the entity data 110 may identify a geographic region for the entities (e.g., a country geographic location for a corporation), a size of an entity (e.g., the number of employees assigned to the entity), an industry sector associated with the entity, etc. The assets data 120 may specify assets of the network infrastructure. For example, the assets data 120 may identify networks used in the network infrastructure, servers, computers, mobile devices, storage resources storing data, or any other type of hardware component, resource, or asset of a network infrastructure.

Referring to FIG. 1, a server 130 may include the network graph component 135. The server 130 may be a processing device such as, but is not limited to, a desktop computer, a laptop computer, a mainframe computer, a personal digital assistant, a rack-mount server, a hand-held device or any other device configured to process data. The server 130 may receive the entity data 110 and the assets data 120 via a network from one or more other servers or processing devices.

Furthermore, the network graph component 135 may generate a network graph 140 based on the entity data 110 and the assets data 120. The network graph may be a graphical structure or representation of the network infrastructure and one or more entities associated with the network infrastructure. In some embodiments, the network graph may be a directed acrylic graph such as a Bayesian network. As described in further detail below, the network graph may include multiple nodes where each node represents an entity or an asset of the network infrastructure. Thus, the network graph may represent the network infrastructure and the relationships between assets of the network infrastructure as well as the relationships between the assets of the network infrastructure and entities associated with the network infrastructure. The probability, likelihood, or an assessment of a successful security breach of the assets of the network infrastructure may be determined by using the network graph generated by the network graph component 135.

Figure 2:
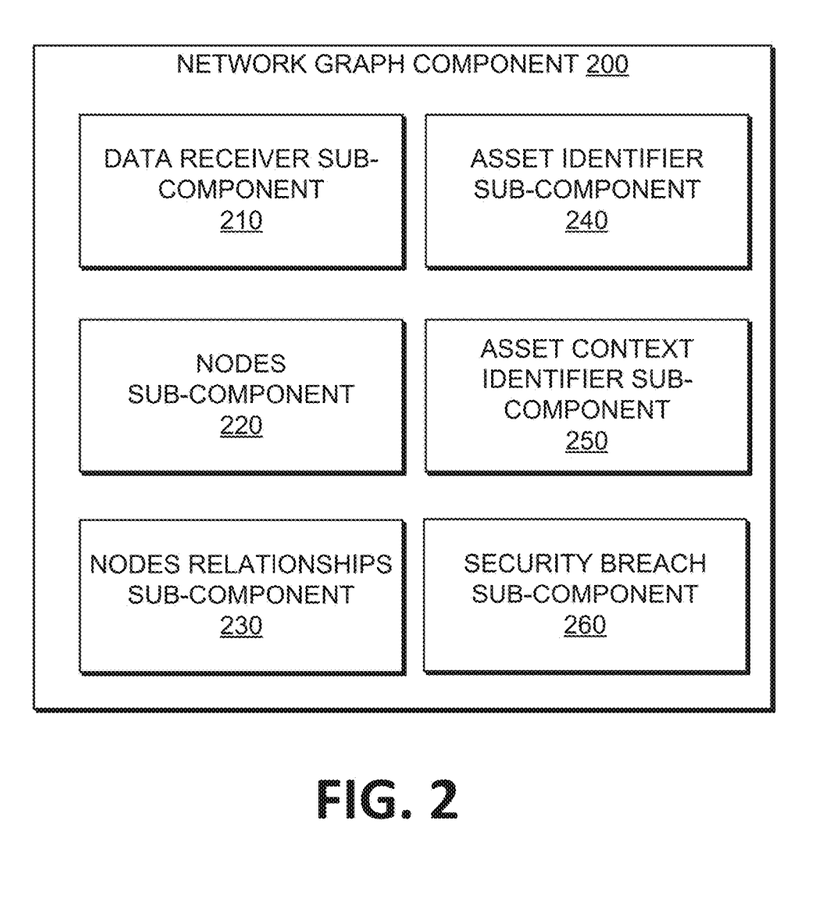
FIG. 2 is a block diagram of an example network graph component in accordance with some embodiments of the present disclosure.

FIG. 2 is a block diagram of an example network graph component 200. In general, the network graph component 200 may generate a network graph based on assets and entities of a network infrastructure. The network graph component 200 may correspond to the network graph component 135 of FIG. 1. The network graph component 200 may include a data receiver sub-component 210, a nodes sub-component 220, a nodes relationships sub-component 230, an asset identifier sub-component 240, an asset context identifier sub-component 250, and a security breach sub-component 260. In alternative embodiments, the functionality of one or more of the sub-components may be combined or divided.

As shown in FIG. 2, the network graph component 200 may include the data receiver sub-component 210 that receives data associated with a network infrastructure for which a network graph is to be generated to represent the network infrastructure. For example, the data receiver sub-component 210 may receive entity data and assets data that identify entities and assets of the network infrastructure. Furthermore, the network graph component 200 may include a nodes sub-component 220 that may create a node for each entity identified by the entity data and for each asset of the network infrastructure identified by the assets data. For example, the nodes sub-component 220 may generate a node in a network graph (e.g., a Bayesian network) for each entity and asset of the network infrastructure. Furthermore, the nodes relationships sub-component 230 may identify and create an edge between the generated nodes of the network graph based on relationships between the entities and assets of the network infrastructure. For example, the entity data may specify relationships between different entities and the assets that are associated with each entity. The asset data may specify the relationships between the different assets of the network infrastructure. In some embodiments, internet protocol (IP) addresses, user accounts or log-in information to assets, or other such network connections between assets of the network infrastructure may be used to identify relationships between assets. Each relationship between the assets may result in an edge being generated in the network graph between nodes representing the assets. Further details with regard to the network graph are described in conjunction with FIG. 4.

Referring to FIG. 2, the network graph component 200 may further include an asset identifier sub-component 240 that may receive a request to identify or generate a probability or an assessment of a security breach of a particular asset of the network infrastructure. In some embodiments, the request may be received in response to a user selection of a node corresponding to the particular asset from a graphical representation of the network graph. Furthermore, the asset context identifier sub-component 250 may identify a context of the particular asset. For example, the context may be based on the relationships between the particular asset and other assets of the network infrastructure that are represented by nodes of the network graph. The network graph component 200 may also include a security breach sub-component 260 that may provide an assessment or probability of the particular asset being subjected to a successful security breach by an unauthorized entity.

Figure 3:
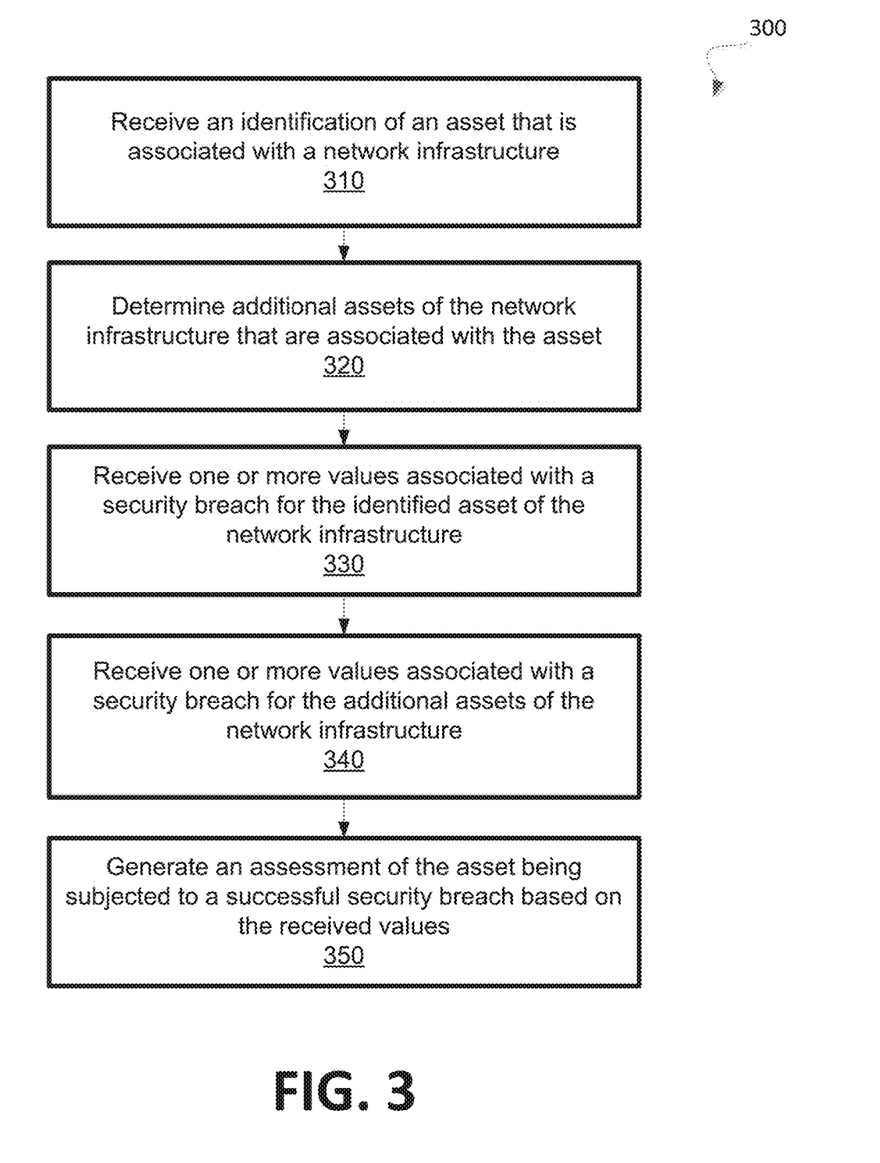
FIG. 3 is a flow diagram of an example method to determine an assessment of a security breach for an asset of a network infrastructure in accordance with some embodiments.

FIG. 3 is a flow diagram of an example method 300 to determine an assessment of a security breach for an asset of a network infrastructure. In general, the method 300 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the network graph component 135 of FIG. 1 may perform the method 300.

As shown in FIG. 3, the method 300 may begin with the processing logic receiving an identification of an asset that is associated with a network infrastructure (block 310). The identification of the asset may be received in response to a user requesting an assessment or a probability of a successful security breach of the asset within the network infrastructure. The identification of the asset may correspond to identifying a node that represents the asset in a network graph. For example, the node may be identified in a Bayesian network. The processing logic may subsequently determine additional assets of the network infrastructure that are associated with the asset (block 320). For example, nodes that are connected by an edge of the network graph with the identified node may be identified. For example, parent nodes of the identified node may be identified where a parent node is another node of the network graph that is connected to the identified node with an edge as described in further detail in conjunction with FIG. 4. Parent nodes of the parent nodes may also be identified. For example, additional nodes that are connected with the parent nodes of the identified node may be identified. Thus, multiple nodes of the network graph that are associated with the identified node may be identified. The processing logic may receive one or more values associated with a security breach for the identified asset of the network infrastructure (block 330). For example, a first value corresponding to whether the asset is likely to be subjected to a successful security breach (e.g., that the asset will be compromised) and a second value corresponding to whether the asset is not likely to be subjected to a successful security breach (e.g., that the asset will not be compromised) may be received. The values may be based on vulnerabilities and controls of the asset as described in further detail below.

The processing logic may subsequently receive one or more values associated with a security breach for the additional assets of the network infrastructure that are associated with the asset (block 340). For example, values associated with entities represented by nodes of the network graph and values associated with assets of the network infrastructure represented by additional nodes of the network graph may be received. The values associated with the entities represented by the nodes of the network graph may relate to a risk level to the security breach for each of the entities (e.g., a likelihood that the entity will be subjected to an attack of a security breach). For example, each entity may be associated with two values corresponding to a low risk level and a high risk level. The two values may provide an assessment as to the likelihood that the entity will be subjected to an attack by the unauthorized entity. For example, the value for the high risk level may provide a measure based on whether the entity has a high likelihood to be subjected to an attack by an unauthorized entity and the value for the low risk level may provide another measure based on whether the entity has a low likelihood to be subjected to an attack by an unauthorized entity. Further details with regard to such values are described in further detail below. Furthermore, the values associated with the assets represented by the nodes of the network graph may relate to a likelihood of a successful security breach for the asset. For example, the value for the successful security breach may provide a measure based on whether the asset has a high likelihood of a successful security breach by an unauthorized entity and the value for the unsuccessful security breach may provide another measure based on whether the asset has a low likelihood of a successful security breach by an unauthorized entity. As described in further detail below, the various values for the nodes may be associated with a conditional probability table (CPT). Although two risk levels (e.g., low risk level and a high risk level) are described, any number of risk levels may be used in conjunction with the present disclosure.

Referring to FIG. 3, the processing logic may further generate an assessment of the asset being subjected to a successful security breach based on the values associated with a security breach for the identified asset and the values associated with a security breach for the additional assets of the network infrastructure that are associated with the identified asset (block 350). In some embodiments, the assessment may further be generated based on the values associated with a security breach for entities associated with the identified asset. The assessment of the security breach may indicate a likelihood or probability that the identified asset will be compromised by a successful security breach by an unauthorized entity. The assessment may be generated based on a Bayesian network (e.g., a Directed Acyclic Graph) and a joint probability distribution of the values of the nodes of the Bayesian network that uses the conditional probability tables for the node representing the identified asset and the nodes represented the one or more entities associated with the identified asset and the nodes representing the additional assets that are associated with the identified asset.

Figure 4:
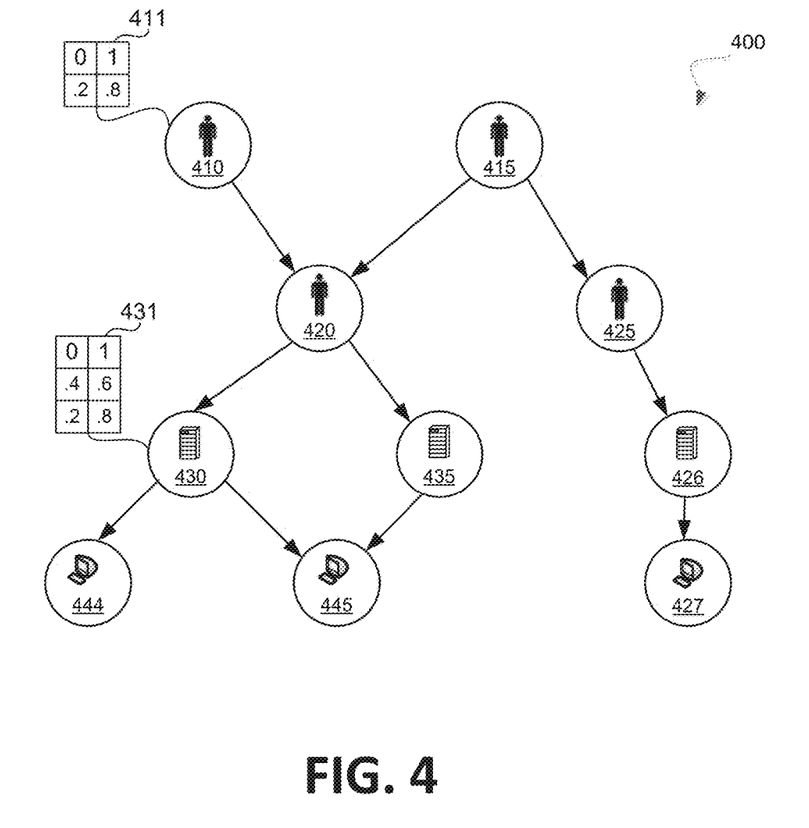
FIG. 4 illustrates an example network graph with nodes representing entities and assets of a network infrastructure in accordance with some embodiments of the present disclosure.

FIG. 4 illustrates an example network graph 400 with nodes representing entities and assets of a network infrastructure. In general, the network graph 400 may be generated by the network graph component 135 of FIG. 1.

As shown in FIG. 4, the network graph 400 includes multiple nodes that represent entities associated with a network infrastructure and assets of the network infrastructure. For example, the node 410 and node 415 may represent corporate entities. As shown, the node 410 may represent a 'Company A' and the node 415 may represent the 'Company Subsidiary.' Furthermore, the node 420 may represent an organizational entity such as a 'Sales' department or organization. Since the node 420 is connected to the nodes 410 and 415 with the edges of the network graph, the nodes 410 and 415 may be considered parent nodes of the node 420. Such a relationship may indicate that each of the 'Company A' represented by the node 410 and the 'Company Subsidiary' represented by the node 415 uses the 'Sales' department represented by node 420. Furthermore, the node 425 may represent another organizational entity such as a 'Legal' department that is used by the 'Company Subsidiary' represented by the node 415.

Referring to FIG. 4, the node 420 may be connected to the nodes 430 and 435 representing different servers of the network infrastructure. Furthermore, the nodes 440 and 445 may represent other assets of the network infrastructure such as mobile devices, desktop computers, laptop computers, or other such processing devices. For example, the server represented by node 430 is connected with edges to the device represented by the node 440 and the device represented by the node 445 while the server represented by the node 435 is connected by an edge to the node 445 but not the node 440. Thus, the server represented by the node 430 may be considered to be able to access or be accessed by the devices represented by the nodes 440 and 445 while the server represented by the node 435 may only be considered to access or be accessed by the device represented by the node 445. Similarly, the node 426 may represent another asset that is used by the 'Legal' organization represented by the node 425 and may be related to another asset represented by the node 427.

As previously discussed, each node may be associated with a conditional probability table. For example, a node representing an entity may be assigned a first type of conditional probability table that specifies a first value representing a low risk level and a second value representing a high risk level of the entity being subjected to an attack by an unauthorized entity. For example, the node 410 representing the entity 'Corporation A' may be assigned a conditional probability table 411 that specifies a first value of 0.2 that provides a measure as to whether the entity is at a low risk level and a second value of 0.8 that provides another measure as to whether the entity is at a high risk level of a security breach attack. Each of the entities may be associated with such a type of conditional probability table. For example, the nodes 415, 420, and 425 may each be associated with a different conditional probability table with additional first and second values. In some embodiments, the first and second values for each of the nodes representing an entity may be based on one or more factors including, but not limited to, a geographic region of the entity, a size or number of employees of the entity, an industry sector of the entity, a revenue of the entity, etc. For example, if a first entity is in the United States and the second entity is in the United Kingdom and if unauthorized entities are more likely to perform a security breach attack to entities located in the United States as opposed to entities located in the United Kingdom, then the first entity located in the United States may have a higher second value than the entity located in the United Kingdom.

Similarly, each asset of the network infrastructure may be assigned a second type of conditional probability table that specifies a first value representing a probability that the asset will not be compromised by a successful security breach and a second value representing a probability that the asset will be compromised by a successful security breach. For example, the node 430 may be assigned a conditional probability table 431 that specifies a first value of 0.4 that provides a measure as to whether the asset represented by the node 430 is not to be compromised and a second value of 0.6 that provides a measure as to whether the asset is likely to be compromised by a security breach, given the parent node (420) is not compromised. The conditional probability table 431 further specifies a value of 0.2 and 0.8 of node 430 being not compromised and compromised, respectively, given the parent node is compromised. Each of the nodes representing an asset of the network infrastructure may be associated with such a type of conditional probability table. For example, the nodes 426, 427, 430, 435, 440, and 445 may each be associated with a different conditional probability table with additional first and second values. In some embodiments, the first and second values for each of the nodes representing one of the assets of the network infrastructure may be based on one or more factors including, but not limited to, vulnerabilities of the asset, controls of the asset, type of the asset, an amount of data stored at the asset or accessed by the asset, type of data stored or accessed by the asset, etc. In some embodiments, vulnerabilities may correspond to known security flaws of the respective asset that may be exploited by an unauthorized entity in an attempt to perform a security breach of the asset. Examples of such vulnerabilities include, but are not limited to, a software bug, an older version of software, a SQL injection, etc. Thus, a vulnerability may be a security flaw associated with a configuration of the asset. A control may correspond to a mitigation of a security breach associated with the respective asset. For example, a control may be a capability of the asset to reduce the susceptibility of the respective asset to a security breach associated with one of the vulnerabilities. In some embodiments, the control may be a software or hardware feature of the asset that has been activated or enabled to provide additional security measure to mitigate or reduce the probability or likelihood of a successful security breach of the asset. Examples of a control may include, but are not limited to, a firewall, antivirus software installed on the asset, etc.

As an example, in order to generate an assessment of a security breach for the computing device represented by the node 444, conditional probability tables for each ancestor node (e.g., each node higher in the hierarchy of the network graph and connected with an edge in a path that includes the node) may be identified. For example, conditional probability tables for nodes 430, 420, 410, and 415 may be identified as each of these nodes may be in a path that includes the node 444. The assessment may be based on a combination of the conditional probability tables for each of the ancestor nodes and the conditional probability table for the node 444. For example, the assessment may be based on each combination of values of the conditional probability tables. In some embodiments, a first combination with respect to a conditional probability table may use one of the first and second value (e.g., the value represented by '0') and a second combination may use the other of the first and second value (e.g., the value represented by '1'). The assessment may use a joint probability function that provides a value that indicates the likelihood of a successful security breach for the asset.

Figure 5:
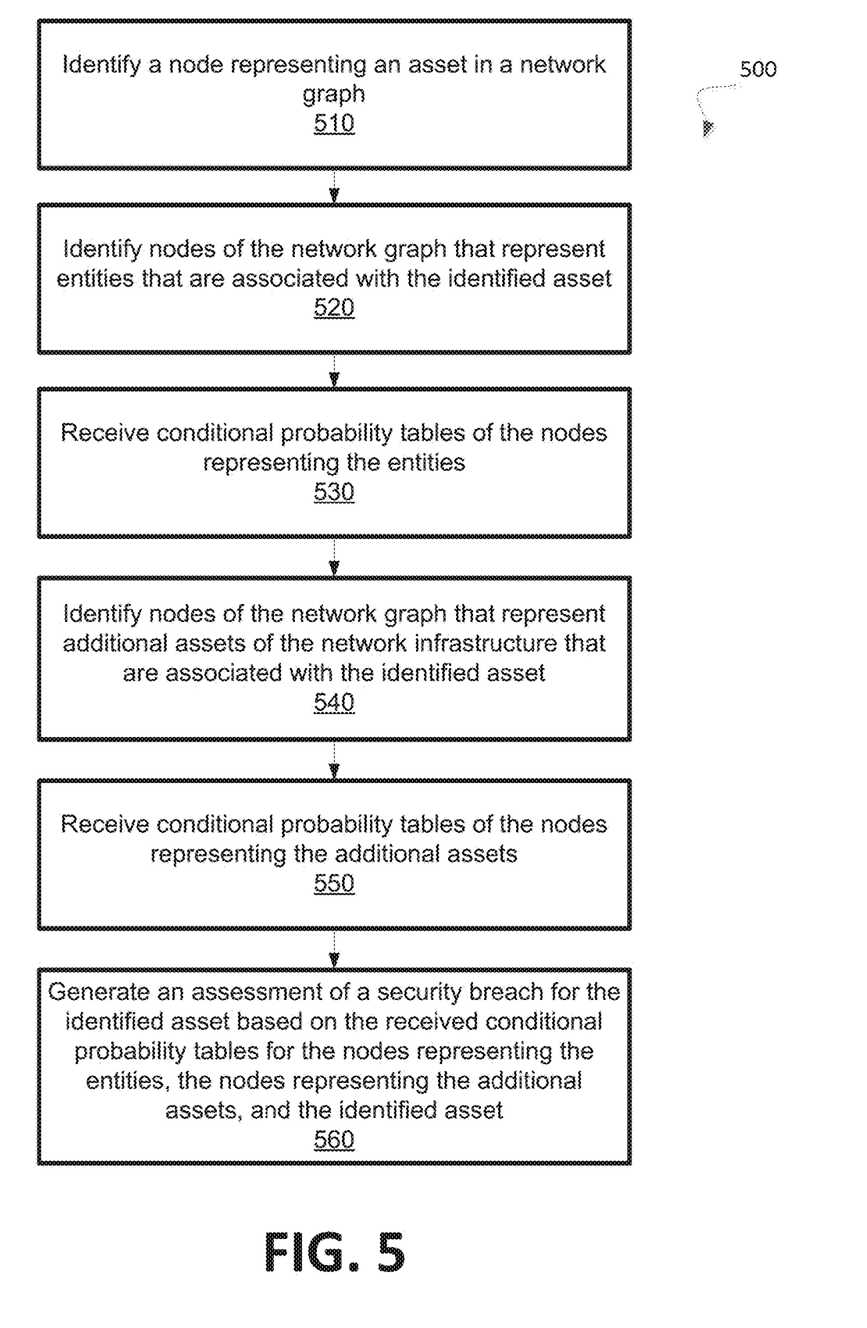
FIG. 5 is an example method to generate an assessment of a security breach for an asset of a network infrastructure by using a network graph in accordance with some embodiments.

FIG. 5 is an example method 500 to generate an assessment of a security breach for an asset of a network infrastructure by using a network graph. In general, the method 500 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the network graph component 135 of FIG. 1 may perform the method 500.

As shown in FIG. 5, the method 500 may begin with the processing logic identifying a node representing an asset in a network graph (block 510). The asset may be an asset that has been selected to be assessed with regard to a security breach. Furthermore, the processing logic may identify nodes of the network graph that represent entities that are associated with the identified asset (block 520). For example, entity nodes that are higher in a hierarchy than the identified node representing the asset and that are in a path that includes the identified node (e.g., the respective entity node is connected with the identified node by an edge or is indirectly connected with the identified node via one or more intermediary nodes that are connected by edges and at least one intermediary node is connected to the identified node by the edge) may be identified. The processing logic may subsequently receive conditional probability tables of the nodes representing the entities (block 530). For example, a conditional probability table that specifies a first value indicating a low risk level and a second value indicating a high risk level for the respective entity node may be received for each of the nodes representing the entities. Additionally, the processing logic may identify nodes of the network graph that represent additional assets of the network infrastructure that are associated with the identified asset (block 540). The nodes that represent the additional assets may be nodes of the network graph that are connected with the identified asset with an edge or are in a path that includes the identified node as described above. The processing logic may subsequently receive conditional probability tables of the nodes representing the additional assets (block 550). For example, a conditional probability table that specifies a first value indicating a low likelihood of a successful security breach and a second value indicating a high likelihood of a successful security breach may be received for each of the additional nodes.

Referring to FIG. 5, the processing logic may further generate an assessment of a security breach for the identified asset based on the received conditional probability tables for the nodes representing the entities, the nodes representing the additional assets, and the identified node (block 560). For example, the assessment may generate a value that is indicative or associated with a probability or likelihood that the asset will be subjected to a security breach from a successful attack from an unauthorized entity. In some embodiments, the value may be a percentage probability of such a successful attack or another such value representing a probability of a successful attack of the asset.

In some embodiments, edge weights between the nodes representing the entities, the nodes representing the additional assets, and the identified node representing the asset may be used to generate the assessment of the security breach for the asset. For example, the edge weights may be used to provide a weighted value for use in the generation of the assessment of the security breach for the asset. The edge weights may be based on the type of assets that are connected by the edge or a number of other assets that are connected with a particular asset. For example, an edge that couples a computing device with a server may be associated with a higher edge weight value than another edge that couples a mobile device with another computing device. In some embodiments, the edge weight may be based on a type of interaction between a first asset and a second asset connected by an edge. For example, a value of the edge weight may be higher if the first asset more frequently accesses the second asset and the value may be lower if the first asset less frequently accesses the second asset. The edge weights may be used in the generating of the values of a conditional probability table.

Figure 6:
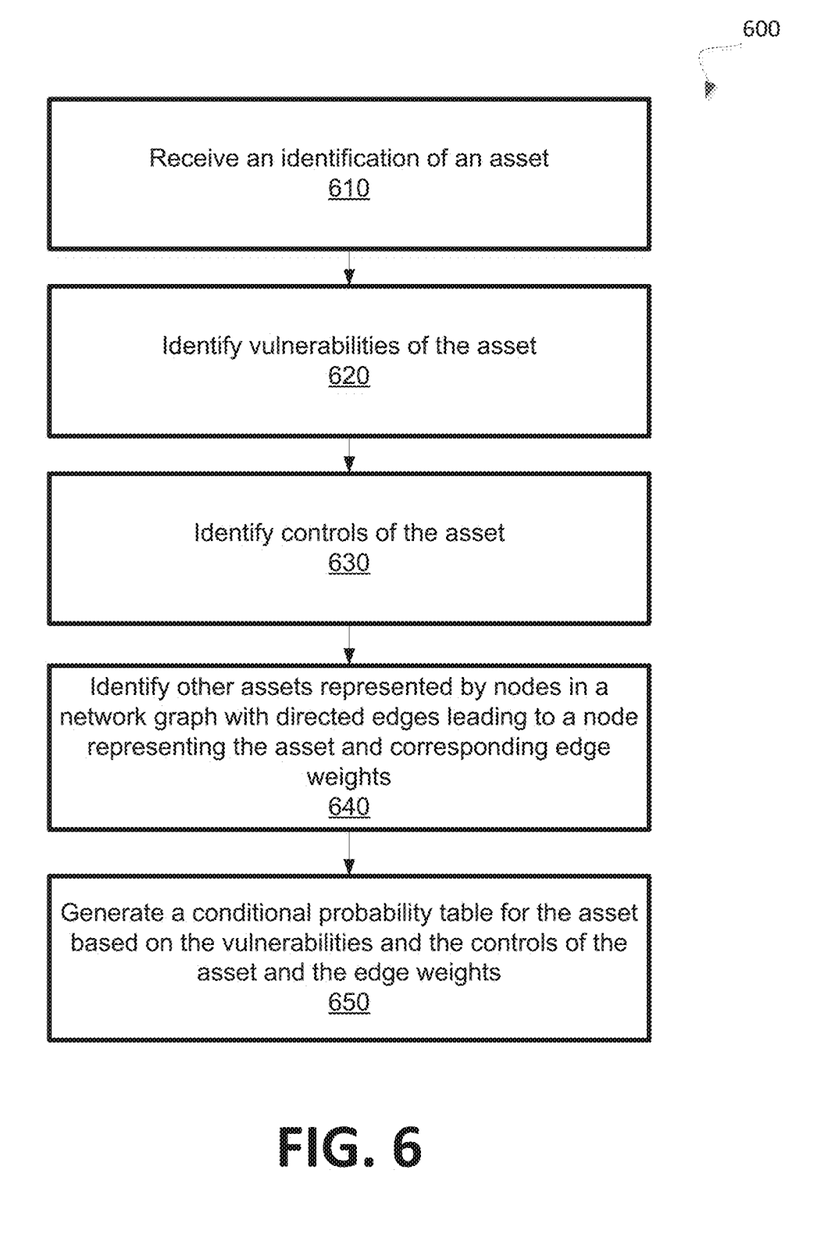
FIG. 6 is an example method to determine a conditional probability table based on characteristics of an asset in accordance with some embodiments.

FIG. 6 is an example method 600 to determine a conditional probability table based on characteristics of an asset. In general, the method 600 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the network graph component 135 of FIG. 1 may perform the method 600.

As shown in FIG. 6, the method 600 may begin with the processing logic receiving an identification of an asset (block 610). For example, an asset of a network infrastructure may be identified. The processing logic may further identify vulnerabilities of the asset (block 620). For example, one or more software and/or hardware vulnerabilities of the asset may be identified. In some embodiments, a type of the asset and characteristics of the asset (e.g., software version, operating system version, type of firewall, type of software installed on the asset, etc.) may be used to identify the vulnerabilities of the asset. For example, a database or a data store may identify known vulnerabilities of the asset based on the characteristics of the asset. The processing logic may further identify controls of the asset (block 630). For example, software or hardware capabilities of the asset that are used to mitigate one or more of the vulnerabilities and that are enabled may be identified. The processing logic may further identify other assets represented by nodes in a network graph with directed edges leading to a node representing the asset and corresponding edge weights (block 640). For example, ancestor nodes of the node representing the asset may be identified and an edge weight between each ancestor node and another node or the node representing the asset may be identified. Subsequently, the processing logic may generate a conditional probability table for the asset based on the vulnerabilities and the controls of the asset and the edge weights (block 650). For example, values for the conditional probability table may be generated based on a combination of the vulnerabilities and controls of the asset and the edge weights of the directed edges of other nodes of the network graph that represent other assets of the network infrastructure.

Figure 7:
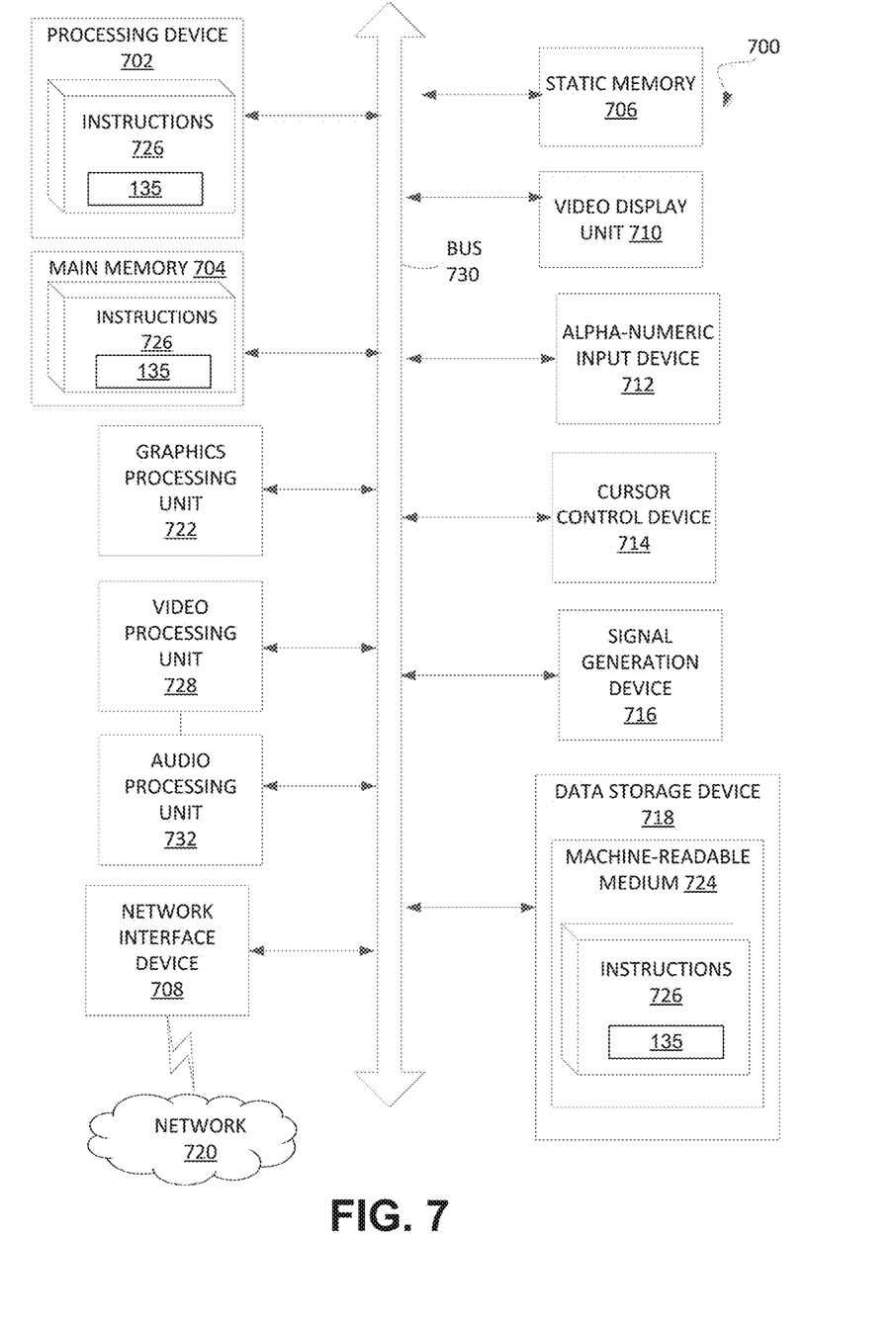
FIG. 7 is a block diagram of an example computer system operating in accordance with the disclosure described herein.

FIG. 7 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computer system 700 may further include a network interface device 608 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In one implementation, the instructions 726 include instructions to implement functionality corresponding to the network graph component (e.g., network graph component 135 of FIG. 1). While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
   receiving an identification of an asset that is associated with a network infrastructure;

identifying additional assets of the network infrastructure that are associated with the asset;

receiving a conditional probability table for each of the additional assets, wherein one or more values of a respective conditional probability table for a respective additional asset of the additional assets is associated with a security breach for the respective additional asset of the network infrastructure that is associated with the asset, and wherein the one or more values of each respective conditional probability table is based on one or more vulnerabilities associated with the respective additional asset and one or more controls associated with the respective additional asset to mitigate the one or more vulnerabilities; and generating, by a processing device, an assessment of a security breach of the asset based on the received one or more values associated with the security breach for the additional assets of the network infrastructure.

2. The method of claim 1, wherein the identifying of the additional assets of the network comprises
receiving a network graph comprising a plurality of nodes representing assets of the network infrastructure;
identifying a node of the plurality of nodes that represents the asset; and
identifying a plurality of nodes representing the additional assets that are associated with the asset,
wherein the conditional probability table is received for each of the identified nodes, wherein the assessment is generated based on the conditional probability tables for the identified nodes.

3. The method of claim 2, wherein the network graph is a Bayesian network.

4. The method of claim 1, further comprising:
identifying an entity associated with the network infrastructure, the entity being associated with the asset;
receiving a plurality of values corresponding to the one or more values associated with a security breach for the entity that is associated with the asset, a first value of the plurality of values corresponding to a high security risk for the entity and a second value of the plurality of values corresponding to a low security risk for the entity, and wherein the assessment of the security breach for the asset is further based on the first value and the second value.

5. The method of claim 1, wherein the assessment of the security breach corresponds to a value indicative of a probability of a successful security breach of the asset.

6. The method of claim 1, wherein identifying the additional assets of the network infrastructure that are associated with the asset comprises:
receiving a network graph representing the network infrastructure;
identifying a node in the network graph that represents the asset; and
identifying additional nodes representing the additional assets that are connected to the node with an edge of the network graph.

7. A non-transitory computer readable medium comprising instructions that, when executed by a processing device, cause the processing device to perform operations comprising:
receiving an identification of an asset that is associated with a network infrastructure;
identifying additional assets of the network infrastructure that are associated with the asset;
receiving a conditional probability table for each of the additional assets, wherein one or more values of a respective conditional probability table for a respective additional asset of the additional assets is associated with a security breach for the respective additional asset of the network infrastructure that is associated with the asset, and wherein the one or more values of each respective conditional probability table is based on one or more vulnerabilities associated with the respective additional asset and one or more controls associated with the respective additional asset to mitigate the one or more vulnerabilities; and generating an assessment of a security breach of the asset based on the received one or more values associated with the security breach for the additional assets of the network infrastructure.

8. The non-transitory computer readable medium of claim 7, wherein to identify the additional assets of the network, the operations further comprise:
receiving a network graph comprising a plurality of nodes representing assets of the network infrastructure;
identifying a node of the plurality of nodes that represents the asset; and
identifying a plurality of nodes representing the additional assets that are associated with the asset,
wherein the conditional probability table is received for each of the identified nodes, wherein the assessment is generated based on the conditional probability tables for the identified nodes.

9. The non-transitory computer readable medium of claim 8, wherein the network graph is a Bayesian network.

10. The non-transitory computer readable medium of claim 7, the operations further comprising:
identifying an entity associated with the network infrastructure, the entity being associated with the asset;
receiving a plurality of values corresponding to the one or more values associated with a security breach for the entity that is associated with the asset, a first value of the plurality of values corresponding to a high security risk for the entity and a second value of the plurality of values corresponding to a low security risk for the entity, and wherein the assessment of the security breach for the asset is further based on the first value and the second value.

11. The non-transitory computer readable medium of claim 7, wherein the assessment of the security breach corresponds to a value indicative of a probability of a successful security breach of the asset.

12. The non-transitory computer readable medium of claim 7, wherein to identify the additional assets of the network infrastructure that are associated with the asset, the operations further comprise:
receiving a network graph representing the network infrastructure;
identifying a node in the network graph that represents the asset; and
identifying additional nodes representing the additional assets that are connected to the node with an edge of the network graph.

13. A system comprising:
a memory; and
a processing device, operatively coupled with the memory, to:
receive an identification of an asset that is associated with a network infrastructure;
identify additional assets of the network infrastructure that are associated with the asset;
receive a conditional probability table for each of the additional assets, wherein one or more values of a respective conditional probability table for a respective additional asset of the additional assets is associated with a security breach for the respective additional asset of the network infrastructure that is associated with the asset, and wherein the one or more values of each respective conditional probability table is based on one or more vulnerabilities associated with the respective additional asset and one or more controls associated with the respective additional asset to mitigate the one or more vulnerabilities; and generate an assessment of a security breach of the asset based on the received one or more values associated with the security breach for the additional assets of the network infrastructure.

14. The system of claim 13, wherein to identify the additional assets of the network, the processing device is further to:

receive a network graph comprising a plurality of nodes representing assets of the network infrastructure;

identify a node of the plurality of nodes that represents the asset; and identify a plurality of nodes representing the additional assets that are associated with the asset wherein the conditional probability table is received for each of the identified nodes, wherein the assessment is generated based on the conditional probability tables for the identified nodes.

15. The system of claim 14, wherein the network graph is a Bayesian network.

16. The system of claim 13, wherein the processing device is further to:

identify an entity associated with the network infrastructure, the entity being associated with the asset; and receive a plurality of values corresponding to the one or more values associated with a security breach for the entity that is associated with the asset, a first value of the plurality of values corresponding to a high security risk for the entity and a second value of the plurality of values corresponding to a low security risk for the entity, and wherein the assessment of the security breach for the asset is further based on the first value and the second value.

17. The system of claim 13, wherein to identify the additional assets of the network infrastructure that are associated with the asset, the processing device is further to:

receive a network graph representing the network infrastructure; identify a node in the network graph that represents the asset; and identify additional nodes representing the additional assets that are connected to the node with an edge of the network graph.

* * * * *